(12) United States Patent
Goldwasser

(10) Patent No.: US 6,324,337 B1
(45) Date of Patent: Nov. 27, 2001

(54) AUDIO SPEED SEARCH

(76) Inventor: Eric P Goldwasser, 993 Barberry Rd., Yorktown Heights, NY (US) 10598

(*) Notice: Subject to any disclaimer, the term of this patent is extended or adjusted under 35 U.S.C. 154(b) by 0 days.

(21) Appl. No.: 08/904,682

(22) Filed: Aug. 1, 1997

(51) Int. Cl.$^7$ ..................................................... H04N 5/91
(52) U.S. Cl. .................................. 386/75; 386/68; 386/81
(58) Field of Search .................................... 386/6, 7, 8, 68, 386/75, 109; 348/512, 515, 518, 565, 423.1; 704/267, 214, 207, 224

(56) References Cited

U.S. PATENT DOCUMENTS

| | | | |
|---|---|---|---|
| 5,161,019 | * 11/1992 | Emanuel | 348/565 |
| 5,241,428 | * 8/1993 | Goldwasser et al. | 386/109 |
| 5,386,493 | * 1/1995 | Degen et al. | 704/267 |
| 5,809,454 | * 9/1998 | Okada et al. | 704/214 |

* cited by examiner

*Primary Examiner*—Wendy R. Garber
*Assistant Examiner*—Christopher Onuaku

(57) ABSTRACT

A speed search (playback) technique whereby the audio portion of a recording of a TV or radio broadcast or other recorded audio or video with audio that contains primarily speech can be played at several times the rate at which it was recorded without changing the pitch. By also playing only those portions of the speech that are the loudest or otherwise selected and skipping over the other sections, the listener can listen for key words that will identify the subject matter while listening to the audio at many times the normal rate. This technique can be used to provide a random access video recorder with a speed search feature in which the viewer will be able to listen to the audio as he/she speed-searches the video. It can also be used in a BVR (Buffered Video Recorder) to listen to the audio from the buffer at a faster rate so as to catch up to a live broadcast. It can also be used in this last mode to watch two broadcasts in the time it would take to watch just one by conventional means.

4 Claims, 3 Drawing Sheets

Figure 1:
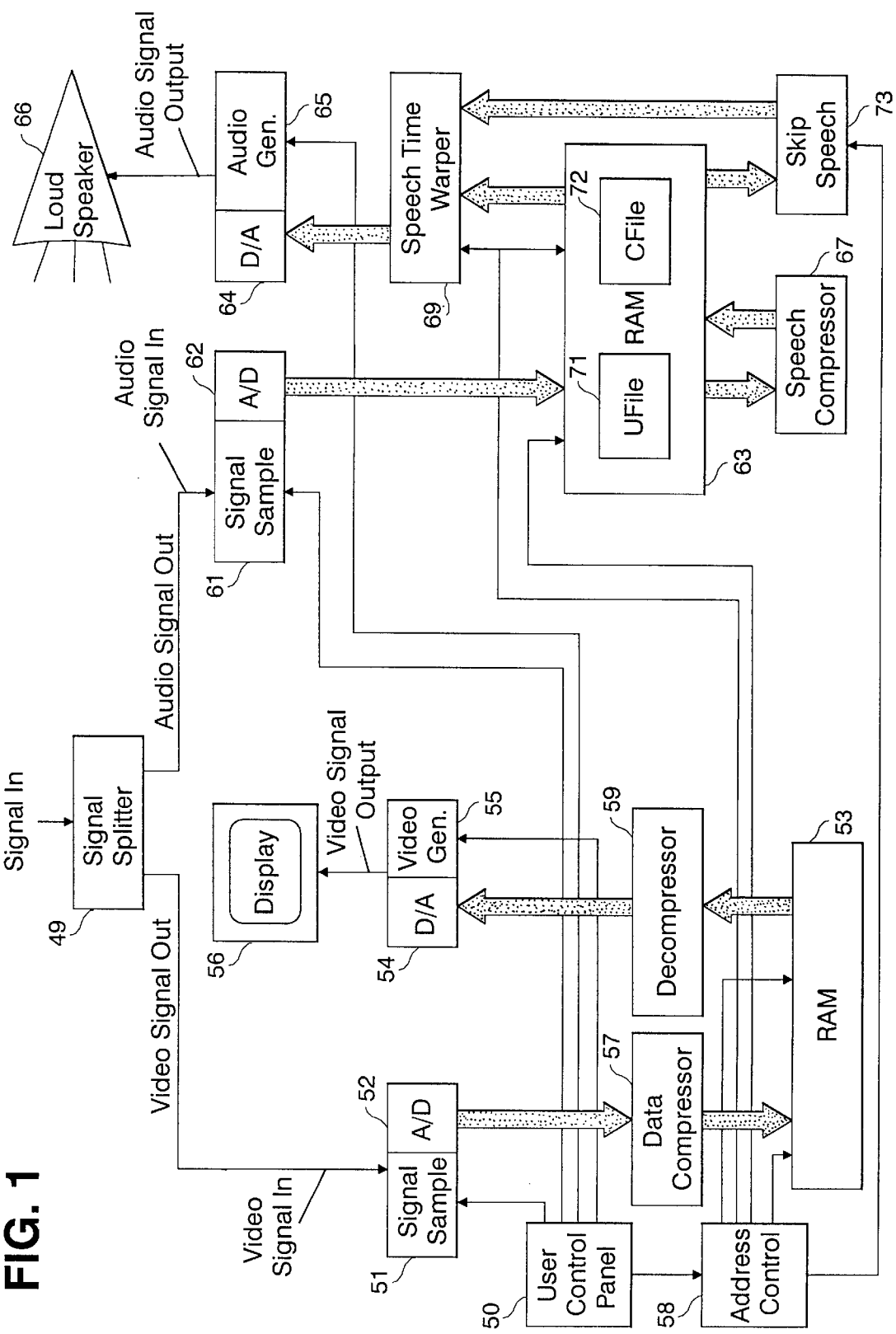

```
                                                                    3CC3333C33333C33333C33CCC
                                                              44CC4444CC444444C4444444CC44444C
                                                  222.22222.22222222222.222223.3333333.3333333.33333333.3333333.3344.44444.44444.44444.44444
A ─ ─ ─ ─ ─ ─ ─ ─ ─ ─ ─ ─ ─ ─ ─ ─ ─ ─ ─ ─ ─ ─ ─ A
        1:45              2:00              2:15
```

FIG. 2B

AUDIO SPEED SEARCH

FIELD OF THE INVENTION

The present invention relates to an apparatus and technique for speeding up the playback of digitally recorded audio without changing pitch and optionally skipping over those sections of the audio which are below a given loudness threshold so as to be able to play the audio much faster, perhaps as much as 10 times faster, than the normal rate, and to use this feature in a video recorder.

BACKGROUND OF THE INVENTION

The vast majority of video tape recorders (VTRs) in use today are analog machines which record video (and accompanying audio) on tape, so that the playback of that video must be sequential. While digital VTRs may come into wide use shortly, it is more likely that random access media such as computer hard drives will replace current VTRs because of the advantages provided by random access.

U.S. Pat. No. 5,241,428 of the present inventor discloses a BVR (Buffered Video Recorder) which digitally records (buffers) video on a random access medium so that a previously stored portion of a program can be played from the buffer while the currently broadcasting portion of the program is simultaneously recorded. In one of the modes of operation of the BVR the viewer can speed the playback of portions of the material to be played-back from the buffer in order to "catch up" with the live broadcast. In another mode the viewer can playback portions of the buffered material in slow motion to do an instant replay. While conventional VTRs permit the video portion of recorded video with audio to be "speed-searched", i.e. viewed at many times real time (typically 9 or more times real time), they do not play the audio portion while the video is being speed-searched, because the audio would change pitch and would therefore be impossible to understand. Similarly, when video with audio is played at a slower speed than it was recorded at, the pitch will change. It becomes impossible to understand speech when the playback rate is even one half the normal rate.

A new speech compression technology is now available from Voxware Inc. of Princeton, N.J., that permits digitized speech to be played at any speed from ⅕ to 5 times real time without a change of pitch. But at about 3 times real time the audio is likely to be too fast to understand if every word is played.

OBJECTS OF THE INVENTION

One object of the current invention is to use audio compression technology such as Voxware's to permit playback of understandable audio (that is primarily speech) as well as video, at low speed search rates of less than 5 times real time, and at slow motion rates that are less than real time.

Another object of the current invention is to permit the audio portion of recorded video to be played at higher speed-search rates by playing only certain portions of the audio that have high energy or other special distinguishing characteristics, and skipping portions that have low energy or lack the aforementioned characteristics. In this mode the listener would hear key words and phrases that will enable him/her to discern the subject matter.

Another object of the current invention is to allow a user of the BVR to watch and listen to the buffered video at a rate somewhat faster than real time without a change of pitch, so the user can catch up to the live broadcast while watching and listening to portions of the video that are of interest.

Another object of the current invention is to provide an inexpensive device similar to a BVR that can buffer only the audio portion of a video broadcast (that is primarily speech) and then play it back at a rate greater than real time without a change of pitch while simultaneously recording the audio portion of the currently broadcasting video. With this device a viewer who is interrupted while watching (and listening) to a video broadcast will be able to return from the interruption and listen to the buffered audio at a rate several times real time so as to catch up to the live broadcast. For example, if the viewer listens to the buffered audio at 2 times real time, the viewer will catch up to the live broadcast after a period of time equal to the duration of the interruption.

Another object of the current invention is to allow a user of the BVR to simultaneously record two programs and watch them at an accelerated rate so as to be able to watch both programs in the time interval of the actual broadcast.

SUMMARY OF THE INVENTION

These objects are achieved, according to the present invention, by recording the audio portion of the video with audio signal in a random access memory area that is separate from the area where the video is recorded. Then the audio is subjected to a compression step that extracts features of human speech. When the user directs the audio to be played back at a given rate, the speech-time-warper program uses the extracted features to play the audio at the rate specified by the user via the control panel and from the address in RAM (random access memory) that corresponds with the video portion that the user selects via the control panel.

If the user specifies a rate of playback which would make it difficult or impossible to understand every word, then the time warper program plays only selected sections of the audio which have been identified in the compression step as having greater energy or other characteristics that may indicate that they contain key words, and skips over other sections of the audio so as to play the key word sections at a rate that is understandable.

DESCRIPTION OF THE PREFERRED EMBODIMENTS

FIG. 1 shows schematically an embodiment of the invention in which the audio and video portions of a video-with-audio signal are split for separate processing.

This embodiment includes a signal splitter 49 which splits the audio and video signals. The video signal is fed to a sampling circuit 51 and an analog-to-digital converter 52 which together create digital samples of the video signal being recorded, which are stored in a random access memory (RAM) 53.

The audio signal is fed to another sampling circuit 61 and an analog-to-digital converter 62 which together create digital samples of the audio signal being recorded, which are stored in a second random access memory 63 as an uncompressed digitized audio file (UFILE) 71 consisting of successive samples. This file is then analyzed by a speech compression program 67 which, if the audio is pure speech, extracts distinguishing features from the file and stores them in a compressed file (CFILE) 72. Responsive to commands received from the address controller 58, which in turn is responsive to the user control panel 50, which may be a hand-held infrared remote control or the like, the compressed file (CFILE) 72 is fed to the speech-time-warper program 69, which sends digital samples to a digital-to-analog converter and audio generator 64 and 65 to convert the compressed file (CFILE) 72 back into speech warped at a preferred playback speed, which is played through the loudspeaker 66.

Similarly the video signal can be reconstituted and sent to the display 56 via the video generator 55. The selection of the audio+video signal to be replayed at any time is controlled by the user via the control panel 50 in the manner disclosed in the aforementioned BVR U.S. Pat. No. 5,241,428 entitled "Variable-Delay Video Recorder". The addresses of the recorded segments of video and audio are used to synchronize the audio and video for playback.

The speech compression program 67 and the speech time-warper program 69 are currently implemented by Voxware Inc. in their ToolVox product. The ToolVox compression program creates a compressed file from a standard PCM digitized speech file and the time-warper program can replay the compressed audio at any speed from ⅕ to 5 times normal speed without a change of pitch that would make the speech difficult or impossible to understand.

According to the current invention, if the user chooses, via the control panel 50, to speed-search video at a speed that exceeds a perception threshold, e.g. to fast-forward through a commercial or the like, so that the time-warped speech is not understandable, then another component, the skip-speech program 73, skips over sections of speech that fall below an energy threshold. As the user increases the speed of the speed-search, the energy threshold is raised so that more and longer sections of speech are skipped. This results in the user hearing only key words that have the highest energy. These key words are played by the time-warper program at a rate specified via the control panel as the maximum rate that is understandable.

In another embodiment of the invention, the audio and video portions of a video-with-audio signal are split for separate processing with the video being recorded on a conventional VTR and the audio being digitized and compressed and stored in a RAM (random access memory). The audio stored in RAM can be synchronized with the video by means of SEMPTE codes stored on the video tape, so that when the video is speed-searched by the user, the time-warped audio that corresponds to the audio being sent to the display can be simultaneously sent to the loudspeaker. As in the previous embodiment, if the rate of speed-search is too fast for the corresponding time-warped audio (speech) to be understandable, the skip-speech program 73 will skip sections of the audio so that the user will hear only the loudest words; typically the loudest words are key words corresponding to the actions depicted in the video. This enables the user to speed-search and still hear what is being discussed, a significant improvement over the speed-search provided by conventional VTRs.

It is to be understood that the present invention thus covers an audio only BVR in which a pure audio signal such as a radio broadcast or the audio portion of a video-with-audio signal is simultaneously recorded and played as in the first embodiment above. Alternatively the skip function described above could be used to skip over sections of video to reduce the RAM required to store the video while the audio is played with or without skipping.

In another embodiment of the invention the user can direct the BVR to simultaneously record two programs which are broadcasting on two different channels (e.g. CBS and NBC). The user can then begin to watch one of the programs from the BVR buffer after half of the program has broadcast, at a rate approximately 50% faster than real time. By quickly skipping over commercials, which typically take about ¼ of the broadcast time, the user can watch the entire program (whose length is ¾ of the length of the broadcast) in just the remaining ½ the broadcast and finish watching the program just as the broadcast ends. The user can then watch the other program (the one which was broadcast on the other channel at the same time as the program that the user just finished watching) at the same 50% faster than real time rate and finish that other program in ½ the time it was broadcast. The user will have thus managed to watch two programs that were broadcast simultaneously in the same length of time that the programs broadcast. While the user is watching the program that broadcast on the second channel the BVR can be simultaneously recording two channels so that when the user finishes watching that program he/she can watch the two new programs in the same length of time that those programs broadcast, etc. Hence with the BVR the user can watch two channels in the same time it takes to watch one channel with a conventional system.

Figure 2A:
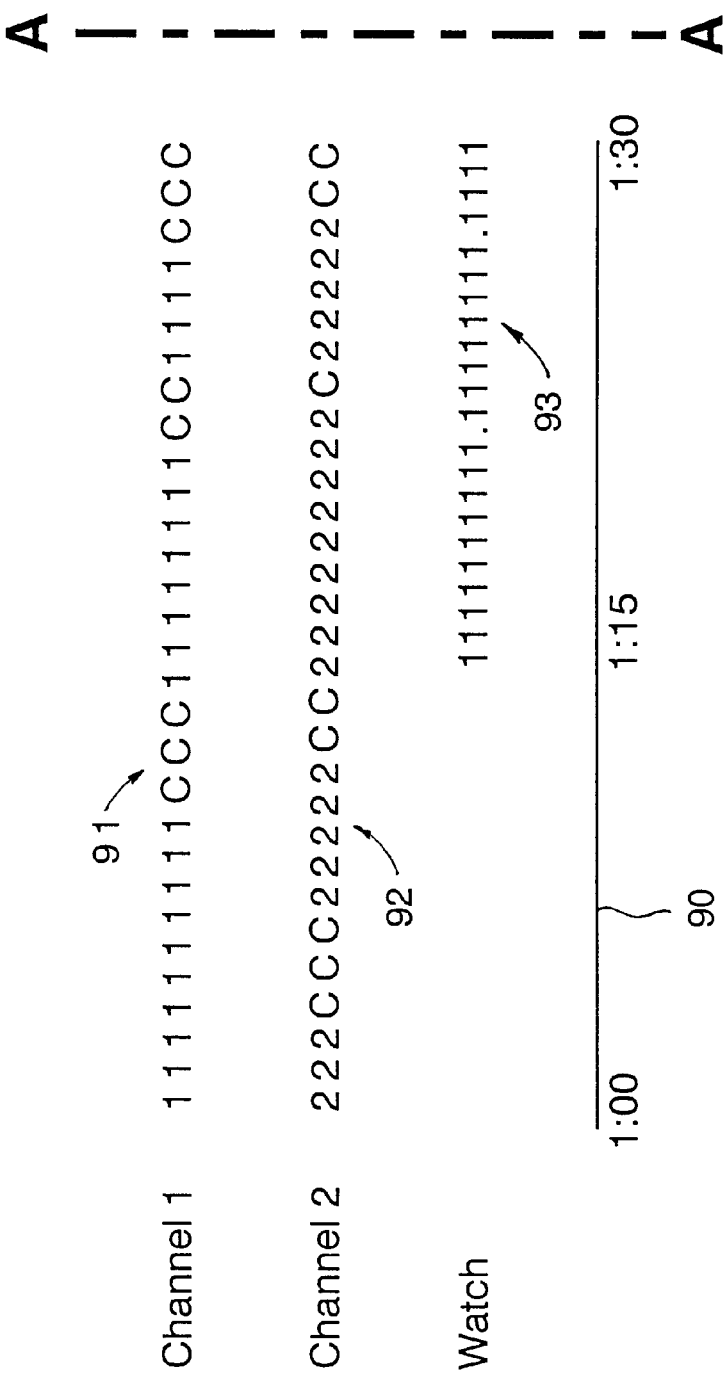

FIG. 2 shows schematically this last embodiment. The axis 90 shows the time starting at 1:00 o'clock and ending at 2:15. The first row of characters 91 shows program 1 being broadcast on channel 1 from 1:00 to 1:30, followed by program 3 from 1:30 to 2:00. At the same time the second row of characters 92 shows program 2 being broadcast on channel 2 from 1:00 to 1:30 followed by program 4 from 1:30 to 2:00. Each of the characters "1", "2", "3", and "4" represents one minute of program broadcast time and the "c" characters represent one minute of commercials. The third line 93 shows what the user is watching from the BVR buffer while the BVR is recording both channels 1 and 2. Again each character represents 1 minute of program time but since the user is watching at approximately 50% faster than normal the user can watch approximately 22 minutes of program in just 15 minutes. The dots in the third line 93 represent the time that the user is skipping over the commercials. Notice that by starting to watch the first program (1) after half of both program 1 and program 2 have been recorded the user can watch both program 1 and program 2 from 1:15 to 1:45 and then watch program 3 and program 4 between 1:45 and 2:15. The user can thus watch two channels in the same time that he/she would normally watch one.

Of course if the user wants to watch programs on channels 1 and 2 that broadcast from 1:00 to 1:30 and then watch programs on two different channels that broadcast from 1:30 to 2:00, he/she can program the BVR accordingly.

What is claimed is:

1. An apparatus for playing a buffered broadcasting audio-video signal, wherein the audio is speech, at a variable playback rate without changing the pitch of the audio of said signal, said apparatus comprising:

separation means for separating said broadcasting audio and video;

a random access storage medium for buffering said audio and video;

recording means for storing said audio and video in one or more buffers on said medium;

algorithmic means for extracting and storing speech features from said buffered audio;

control means for choosing playback rate;

synchronization means, responsive to said control means, for synchronizing said buffered audio with the buffered video of said signal;

play means, responsive to said control means, for using said features to play said buffered audio at said playback rate without change of pitch; and means for controlling asynchronous operation of said recording means and said play means such that said broadcast can be continuously recorded during either continuous or intermittent playback of said buffered audio and video at said playback rate.

2. An apparatus for playing a stored audio-video signal wherein the audio is speech, at a playback rate which is not too fast to understand the video, but is too fast to understand all the audio, even if the pitch is unchanged, wherein said apparatus comprises:

separation means for separating said audio and video;

a random access storage medium for storing said audio;

algorithmic means for extracting and storing speech features from said audio;

control means for choosing playback rate;

synchronization means, responsive to said control means, for synchronizing said audio with the video of said signal;

play means, responsive to said control means, for using said features to play portions of said audio at said playback rate without change of pitch; and distinguishing means responsive to said control means, for identifying portions of the audio to be played when said playback rate is such that all of the audio cannot be understood wherein said play means will play said portions of said audio identified by said distinguishing means, without change of pitch and in rough synchronization with said video, since lip synchronization is virtually impossible at the highest playback rates that permit understanding of the video, and wherein said distinguishing means will identify shorter and fewer portions as said playback rate is increased by said control means.

3. An apparatus according to claim 2, wherein said apparatus further comprises:

means for recording said video-audio signal as it is broadcast by storing it; and means for controlling asynchronous operation of said recording means and said play means such that said broadcast can be continuously recorded during either continuous or intermittent playback of said synchronized audio and video at said playback rate.

4. An apparatus allowing a user to watch two distinct video-audio program signals that are broadcasting simultaneously in the amount of time that it would normally take to watch one of said program signals, said apparatus comprising:

recording means for simultaneously recording both said video-audio program signals as they broadcast by storing them in a buffer;

play means for playback of said buffered program signals at a rate approximately 50% faster than normal without changing audio pitch; and means for controlling asynchronous operation of said recording means and said play means such that both said simultaneously broadcasting program signals can be continuously recorded during either continuous or intermittent playback of either of said buffered programs at said playback rate;

whereby a user can watch both of said broadcasts in the same length of time as the broadcast of each by skipping over commercials, which typically make up ¼ of the total broadcast time, and watching each of said broadcasts in approximately ⅔ of the normal non commercial broadcast time, thereby allowing a user to watch both of two simultaneously broadcast program signals sequentially in the same time as it takes to broadcast one of said program signals, albeit with a delay to allow a sufficient portion of the first program to be watched to be recorded so the faster playback will not catch up to the live broadcast and thereby empty the buffer.

* * * * *